M. WILSON.
BABY COMFORTER.
APPLICATION FILED JULY 31, 1918.

1,298,616.

Patented Mar. 25, 1919.
2 SHEETS—SHEET 1.

WITNESSES

INVENTOR
Mary Wilson,
BY
ATTORNEYS

M. WILSON.
BABY COMFORTER.
APPLICATION FILED JULY 31, 1918.
1,298,616.
Patented Mar. 25, 1919.
2 SHEETS—SHEET 2.
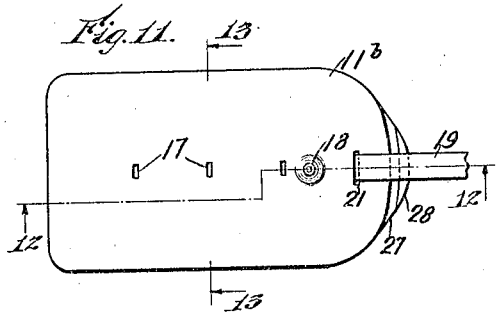
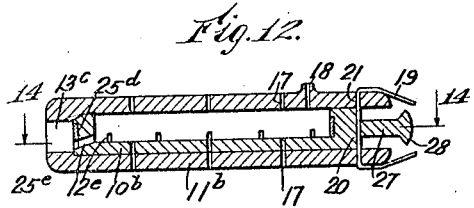
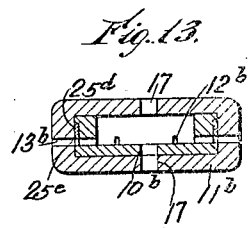
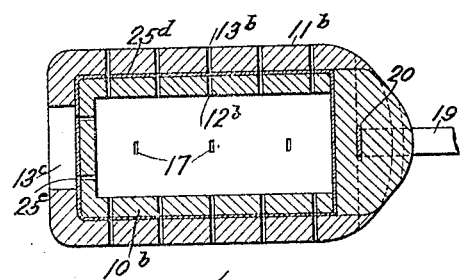
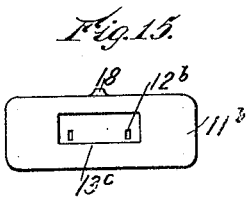
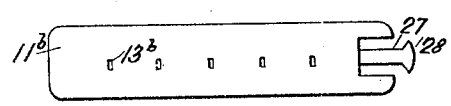
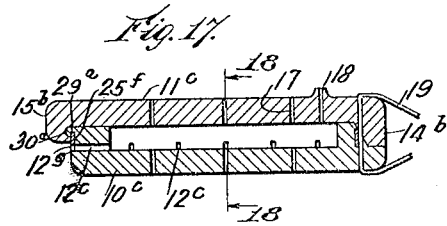
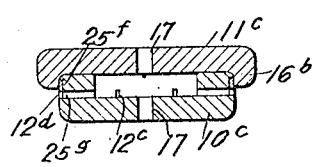
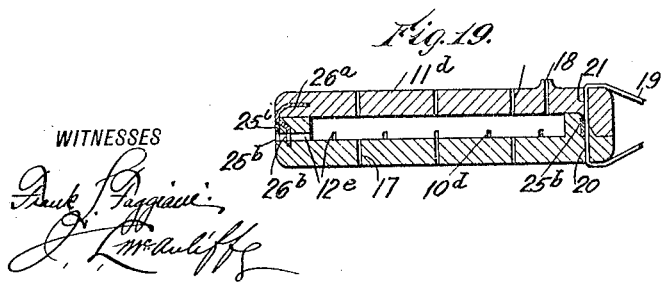
WITNESSES
INVENTOR
Mary Wilson,
BY
ATTORNEYS

UNITED STATES PATENT OFFICE.

MARY WILSON, OF NORTHCOTE, AUCKLAND, NEW ZEALAND.

BABY-COMFORTER.

1,298,616.  Specification of Letters Patent.  Patented Mar. 25, 1919.

Application filed July 31, 1918. Serial No. 247,627.

*To all whom it may concern:*

Be it known that I, MARY WILSON, a subject of the King of Great Britain, and a resident of Northcote, Auckland, New Zealand, have invented a new and Improved Baby-Comforter, of which the following is a full, clear, and exact description.

My invention relates to a baby comforter and teething device and particularly to a device of the indicated character made of suitable shape and of a size to be inserted in a child's mouth.

Objects of the invention are to provide a comforter formed of two main separable members adapted to be readily cleaned, whereby to be maintained in a sanitary condition; and to provide a device having a limited degree of resiliency whereby to be effective in cutting teeth without being harsh on the child's gums and at the same time to have sufficient strength and body to be durable.

A further important object of the invention is to provide a comforter of a character to constitute a holder for sweets, such as sugar, treacle, or the like, whereby to make the device attractive to the child, or to constitute a means for the self-administering of medicine, the sweets or the medicine being adapted to be expressed from the resilient comforter by the act of the child biting on the comforter.

A further important object of the invention is to provide a device of the indicated character in which flexible means constitutes at one and the same time a fastener for the separable elements of the comforter and means to secure the same to the child as by hanging it about the child's neck.

The stated objects and others will more clearly appear from the particular description following.

Reference is to be had to the accompanying drawings forming a part of this specification, it being understood that the drawings are merely illustrative of practical examples of the invention.

Fig. 11 is a plan view showing a still further modification, part being broken away;

Fig. 12 is a longitudinal vertical section on the line 12—12, Fig. 11;

Fig. 13 is a cross section on the line 13—13, Fig. 11;

Fig. 14 is a sectional plan view as indicated by the line 14—14, Fig. 12;

Fig. 15 is a front end view of the form of device shown in Figs. 11 to 14;

Fig. 16 is a side elevation of said device shown in Figs. 11 to 15;

Fig. 17 is a view similar to Figs. 2, 7 and 12, but illustrating a further modification;

Fig. 18 is a cross section on the line 18—18, Fig. 17;

Fig. 19 is a view similar to Fig. 17 but showing a slight modification thereover.

Figure 1:
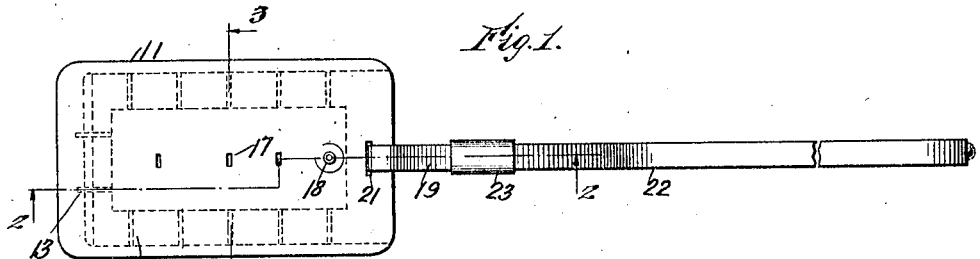
Figure 1 is a plan view of a child's comforter embodying my invention.
Figure 2:
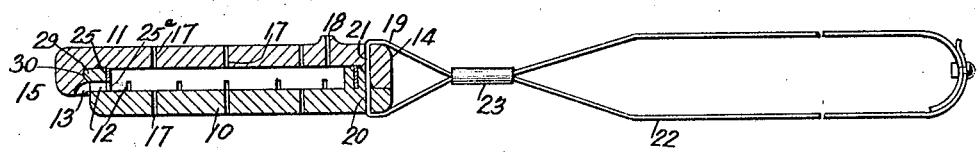
Fig. 2 is a longitudinal vertical section on the line 2—2, Fig. 1.
Figure 3:
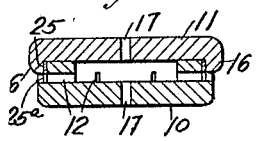
Fig. 3 is a transverse vertical section on the line 3—3, Fig. 1.
Figure 4:
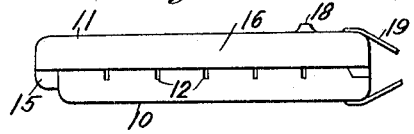
Fig. 4 is a side elevation, part being broken away.
Figure 5:
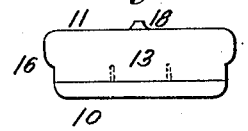
Fig. 5 is a front end view.

Referring more particularly to Figs. 1 to 5, the device includes a tray 10 and a cover 11 therefor to form jointly an inclosure to constitute a container to receive sweets or a medicine. In this form of the invention lateral slots 12 lead from the interior through the walls of tray 10 and corresponding outlet openings are formed in the cover 11 wherever it overlaps the openings in the tray, there being indicated at 13 outlet openings registering with certain of the openings 12. The cover 11 is flanged there being indicated a rear flange 14, a front flange 15, and side flanges 16, overlapping respective flange portions of the tray. In addition to the lateral openings there may be openings in the top or bottom of the device or both, there being shown openings 17 in the bottom of the tray 10 and in the top of the cover 11. A vent opening 18 is formed in the device, conveniently in the cover 11 at the top.

In order to fasten the cover and tray together, I provide a strap 19 which extends through registering slots 20, 21 in the tray and cover and is then extended rearwardly a length to form a loop 22 for fastening the comforter to the child, as for example by passing the loop 22 around the child's neck. On the strap 22 is a slide 23 which can be slid close to the comforter to cause the strap to tightly hold the tray and cover together. If desired, also, the device may have suitable strengthening means, there being indicated a band or strip 25 which may be of celluloid or other suitable material, embedded in the flange in the tray. In the reinforce 25 outlet orifices 25$^a$ are made to register with certain orifices in the tray and cover. Also, to effect an interlocked engagement of the tray and cover, the flange of the tray at the front may have a bead 29 thereon received in a corresponding groove or depression 30 in the cover.

Figure 6:
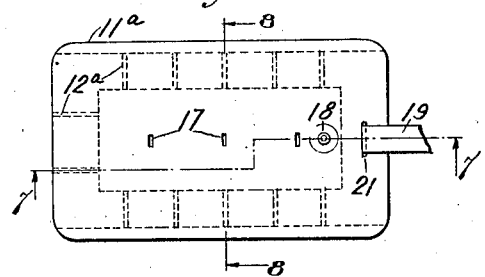
Fig. 6 is a plan view illustrating a modification, part being broken away.
Figure 7:
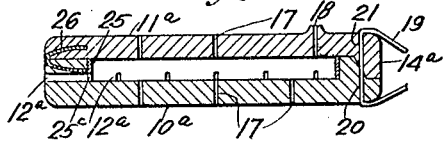
Fig. 7 is a longitudinal vertical section on the line 7—7, Fig. 6.
Figure 8:
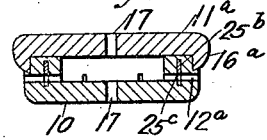
Fig. 8 is a cross section on the line 8—8, Fig. 6.
Figure 9:
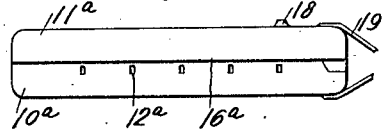
Fig. 9 is a side view of the form of device shown in Figs. 6 to 8.
Figure 10:
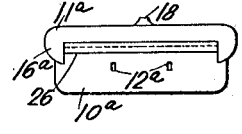
Fig. 10 is a front end view of said device.

In the form shown in Figs. 6 to 10, certain features correspond with those previously described and which are therefore given corresponding reference numerals which need not be further referred to. In the form shown in Figs. 6 to 7, the cover 11 is held by the tray permanently at one end by a flexible hinge 26 which may be of flexible leather, rubber, or a combination of these materials. The reinforcing element 25$^a$ runs, at the interior of the tray, around the flange thereof. The orifices 12$^a$ correspond in the main with those previously referred to and in the reinforce 25$^b$ registering orifices 25$^c$ are produced. In this form of the invention the bead 29 and groove 30 are omitted, though a rear flange 14$^a$ and side flanges 16$^a$ are advantageously employed.

In the form shown in Figs. 11 and 16, the tray 10$^b$ is received in a cover 11$^b$ in the form of an envelop, closed except at the rear end, the latter being open for the insertion and removal of the tray. Registering orifices 12$^b$, 13$^b$ are formed in the tray and cover and an additional large opening 13$^c$ may be formed in the rear end of the envelop to facilitate thorough cleaning. A reinforce 25$^d$ has orifices 25$^e$ registering with outlet openings in the tray and cover. With this form of tray also, the same may be provided with a handle flange 27 thickened to provide finger-holding beads 28 at the outer end thereof.

In the form shown in Figs. 17 and 18 the device corresponds to a large extent with the form shown in Figs. 1 to 15, there being a bead 29$^a$ and corresponding depression 30$^a$ in the tray 10$^c$ and cover 11$^c$, respectively, at the front. The flanges 15$^b$, 16$^b$ of the cover do not overlap the orifices 12$^c$ of the tray. The reinforcing band 25$^f$ has orifices 25$^g$ registering with the orifices 12$^c$.

The form illustrated in Fig. 19 corresponds with that illustrated in Fig. 17 except at the front where a flexible hinge 26$^a$ is employed and embedded in the tray 10$^d$ and cover 11$^d$. Outlet orifices 12$^e$ are formed in the flange of the tray and registering orifices 25$^h$ are formed in the reinforces 25$^i$. Also, registering orifices 26$^b$ are formed in the hinge 26$^a$.

In all the forms of the device the cover or tray, or both, are formed of suitable material adapted to have a limited resiliency. The features of the different modifications may be embodied in a suitable oblong, round, or other form, to simulate a biscuit or lollypop and any suitable material may be employed such as rubber, gutta percha, celluloid, or the like. The device is particularly useful as a soother when the child is teething and in its various forms its construction is such as to provide a somewhat yielding or semi-resilient device which may be bitten upon by the teeth or gums, or the child will be induced to suck on the device after the manner of consuming a lollypop, for extracting the sweet food, confection, or medicine.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A child's comforter including a tray, a separate cover therefor, the two jointly forming a container adapted to hold material to be fed or administered, said container being sufficiently resilient to be partially collapsed and formed with outlet orifices through which the contents may exude, together with a fastener element passing through both the cover and tray and having a form to constitute a means to secure the comforter on the child.

2. A child's comforter including a tray, a separate cover therefor, the two jointly forming a container adapted to hold material to be fed or administered, said container being sufficiently resilient to be partially collapsed and formed with outlet orifices through which the contents may exude, the tray and cover having at the rear end thereof registering openings extending therethrough from top to bottom, and a flexible element passing through said elements to fasten the same together, said element being given a looped form to be hung about the child's neck.

3. A child's comforter including a tray, a separate cover therefor, the two jointly forming a container adapted to hold material to be fed or administered, said container being sufficiently resilient to be partially collapsed and formed with outlet orifices through which the contents may exude; together with a reinforce band extending about the tray and formed with outlet orifices registering with the first-mentioned outlet orifices.

4. A child's comforter including a tray, a separate cover therefor, the two jointly forming a container adapted to hold material to be fed or administered, said container being sufficiently resilient to be partially collapsed and formed with outlet orifices through which the contents may exude; means to hinge the cover to the tray at the front, and means detachably fastening the cover and tray at the rear, said last-mentioned means being formed into a loop to hang the comforter about the child's neck.

5. A child's comforter constituting a container to hold food, medicine, or other suitable material, and including a tray and a cover therefor, said cover and tray having registering outlet orifices and being sufficiently resilient to be partially collapsed by a child to cause the contents to exude through said orifice.

6. A child's comforter constituting a container to hold food, medicine, or other suitable material, and including a tray and a cover therefor, said cover and tray having registering outlet orifices and being sufficiently resilient to be partially collapsed by a child to cause the contents to exude through said orifice; together with a reinforce strip extending about the tray and formed with outlet orifices registering with those in the tray and cover.

7. A child's comforter including a tray, a separate cover therefor, the two jointly forming a container adapted to hold material to be fed or administered, said container being sufficiently resilient to be partially collapsed and formed with outlet orifices through which the contents may exude; together with means to fasten the tray and cover, said fastening means consisting of a bead on the tray and a corresponding groove on the cover at the front of the comforter, and a flexible fastener element passing through the tray and cover at the rear, said flexible fastener being looped to hang the comforter about the child's neck.

MARY WILSON.

Witnesses:
 ETHEL FRANCES COURTNEY,
 CHARLES G. WINSLOW.

Copies of this patent may be obtained for five cents each, by addressing the "Commissioner of Patents, Washington, D. C."